United States Patent Office

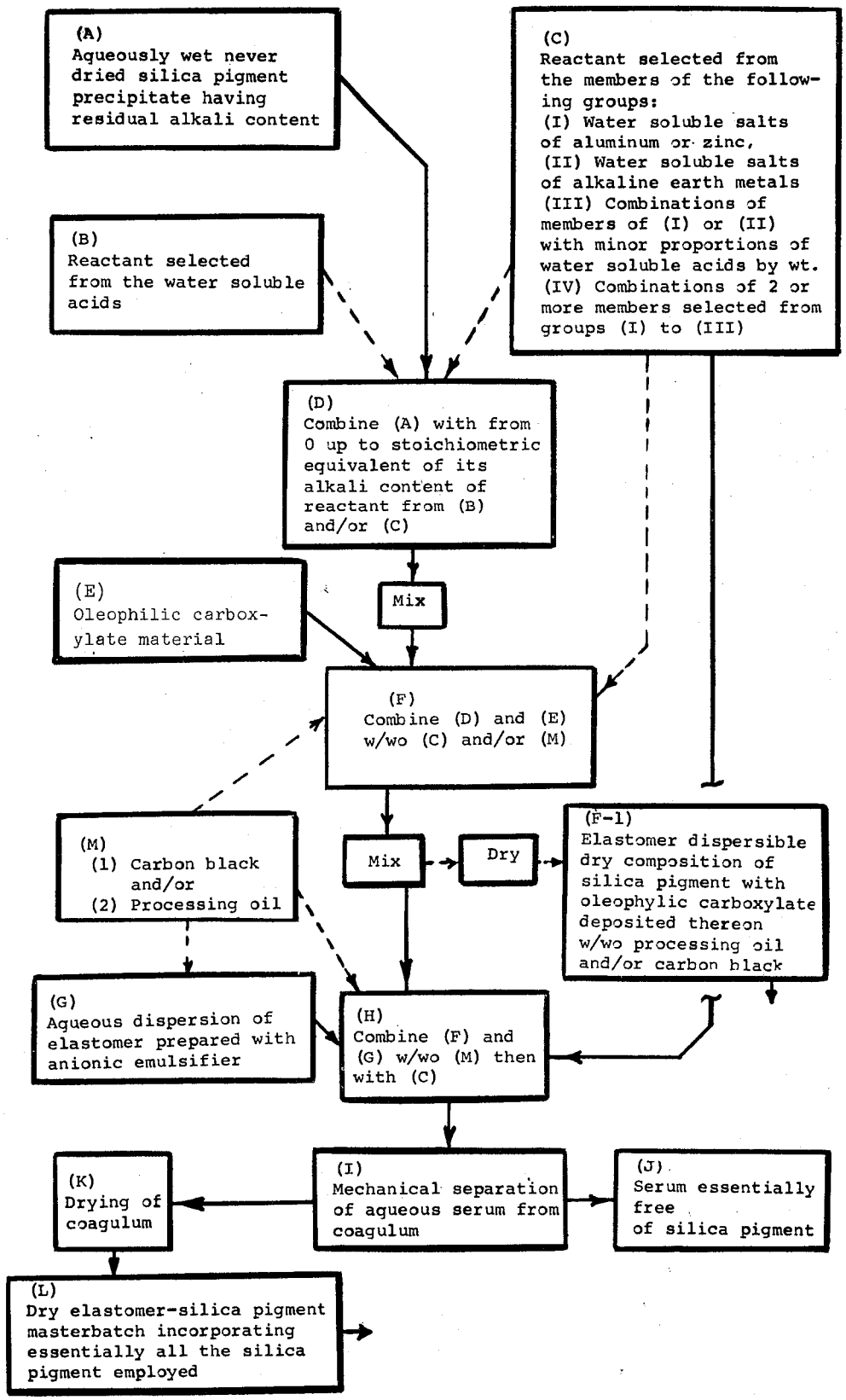

3,686,219
Patented Aug. 22, 1972

---

3,686,219
SILICA PIGMENTS AND ELASTOMER-SILICA PIGMENT MASTERBATCHES AND PRODUCTION PROCESSES RELATING THERETO
Oliver W. Burke, Jr., Fort Lauderdale, Fla.
(1510 SW. 13th Court, Pompano Beach, Fla. 33061)
Continuation-in-part of application Ser. No. 798,215, Sept. 16, 1968, which is a division of application Ser. No. 611,250, Jan. 24, 1967, now Patent No. 3,523,096, which is a continuation-in-part of applications Ser. No. 458,379 and Ser. No. 458,420, May 24, 1965, and Ser. No. 479,806, Aug. 16, 1965, now Patent No. 3,401,017. This application July 16, 1970, Ser. No. 55,459
Int. Cl. C08c *11/10;* C08d *9/00*
U.S. Cl. 260—33.6 AO                8 Claims

---

ABSTRACT OF THE DISCLOSURE

Curbing of silica pigment losses and the promotion of uniformity of product in the preparation of an ealstomer-silica pigment masterbatch are effected (a) by combining (1) an aqueously wet hydrated silica pigment precipitate which has a bound alkali content, which has been prepared by precipitation from an aqueous alkali metal silicate solution, and which has been continuously maintained in an aqueously wet state without having been dried therefrom after its precipitation, with (2) a quantity of oleophilic carboxylate material, (3) combining the resulting treated wet silica pigment slurry with an aqueous dispersion of the elastomer containing an anionic dispersing agent, with or without (4) carbon black and/or processing oil, and (5) with selected reactant-coagulant, and (b) recovering the resulting coagulum as a masterbatch, the steps prior to (b) having rendered the serum of the aqueous mixture essentially free of silica pigment. Prior to combination with the elastomer dispersion the oleophilic carboxylate treated silica pigment may be recovered as a useful dispersible silica pigment product, or the wet silica pigment may be treated with water soluble salts of aluminum and/or zinc and/or alkaline earth metal and/or mineral acid, together with the oleophilic carboxylate, and after such treatment the resulting pigment composition may be recovered from the slurry with or without prior addition of processing oil to the slurry, as a useful dispersible silica pigment composition, or the so treated wet silica pigment may be combined as in (3), (4) and (5) above, and be recovered as in (b) above in the form of a masterbatch.

---

CROSS REFERENCE TO RELATED APPLICATIONS

This application is a continuation-in-part of copending application Ser. No. 798,215, filed Sept. 16, 1968, now abandoned, as a division of application Ser. No. 611,250, filed Jan. 24, 1967, now U.S. Pat. No. 3,523,096, said application Ser. No. 611,250 having been a continuation-in-part of earlier applications Ser. No. 458,420, filed May 24, 1965, now abandoned; Ser. No. 458,379, filed May 24, 1965, now abandoned; and Ser. No. 479,806, filed Aug. 16, 1965, now U.S. Pat. No. 3,401,017, the disclosures of all of which are incorporated herein by reference. Furthermore, this application is directed to a species of invention that was nonelected in applicant's copending application Ser. No. 55,384, filed July 16, 1970, and, pursuant to a restriction requirement, was withdrawn from consideration in that case.

BACKGROUND OF THE INVENTION (1) Field of the invention

The field to which this invention pertains is the preparation of dispersible silica pigments and of masterbatches from latices (i.e. aqueous dispersion) of elastomers and aqueous slurries of precipitated silica pigments.

(2) Description of the prior art

It is well known in the art that attempts to make masterbatches from elastomer latex and aqueously dispersed hydrated silica pigment by latex masterbatching have resulted in loss of large amounts of the hydrated silica pigment in the mother liquor and in non-uniform masterbatches, and that even the addition of tetraethylene pentamine (Whitby, Synthetic Rubber, John Wiley & Sons, Inc., New York, 1954, p. 676) or glue, gelatin or casein (U.S. Pat. No. 2,616,860) has not provided a satisfactory solution to this problem. Also, to applicant's knowledge there is not at the present time any elastomer-silica masterbatch being offered on the commercial market, nor are the dispersible dry silica pigment compositions provided by this invention known.

BRIEF DESCRIPTION OF THE DRAWING

The single figure of the drawing is a block-diagram illustrative of the process aspect of the invention.

SUMMARY OF THE INVENTION

It is known to those skilled in the art to prepare hydrated silica pigment for the reinforcement of rubber by precipitation from aqueous solutions of alkali metal silicates with the aid of carbon dioxide, and to carry out such precipitation in manners to avoid the formation of gelatinous masses (i.e. the formation of silica gel) and to promote the precipitation of a silica pigment in finely divided form (i.e. in particles in the reinforcing size range of about 0.015 to about 0.150 microns, preferably 0.02 to 0.06 micron) and to recover the pigment from the resulting wet silica pigment by filtration, washing and drying.

The wet silica pigments formed by precipitation from alkali metal silicate solutions with the aid of carbon dioxide have a bound alkali content in the range of about 0.1 to 10% by weight as $Na_2O$, and upon being dried in this state form aggregates, from the pigment particles of reinforcing size, which aggregates are of much greater than reinforcing size and will not adequately disperse (i.e. break down into particles of reinforcing size) when incorporated into rubber either by dry compounding or latex compounding.

When one treats such alkaline wet silica pigments with water soluble salts of alkaline earth metals, e.g. calcium salts, to substantially replace the bound alkali metal of the silica, the resulting pigment, when dried, still evidences the formation of aggregates of greater than reinforcing size, which do not adequately disperse in the rubber.

When one treats the alkaline wet silica pigments with the water soluble salts of aluminum and/or zinc, to substantially replace the alkali metal content thereof, the resulting acidic pigment, when dried, disperses to a greater extent in rubber, evidencing less aggregation than the neutral and alkaline products referred to above.

Finally, when one renders the wet silica pigment strongly acidic, by treatment with sulfuric acid and drying, the resulting strongly acidic product is more readily dispersible in rubber, and exhibits minimum aggregation; however, such highly acidic pigments are not practicable for use in the reinforcement of rubbers, since their acidity adversely effects vulcanization thereof.

Thus the drying of the wet silica pigment in alkaline, neutral, and moderately acidic states, in each instance causes the formation of aggregates of pigment particles to a greater or lesser degree which aggregation prevents adequate dispersion of the dry pigment in the rubber; the formation of these aggregates by the drying of the pigment is irreversible; and they remain mostly as aggregates that do not disperse in the rubber either by dry compounding or latex compounding.

This invention is based on the premise that uniformity of an elastomer-pigment masterbatch depends both on obtaining incorporation of a measured quantity of pigment in the masterbatch (e.g. avoiding loss of pigment in the serum in wet masterbatching) and adequate dispersion of the pigment in the elastomer in particles of reinforcing size (e.g. minimizing the pigment aggregation problem); and the present invention provides a process for accomplishing these ends by forming the masterbatch from aqueously wet hydrated silica pigment precipitate having a bound alkali content of 0.1 to 10% by weight as $Na_2O$; which has been prepared by precipitation from an aqueous solution of alkali metal silicate with the aid of carbon dioxide; and which has continuously been maintained in an aqueously wet state after its precipitation without having been dried therefrom; and which is combined with an elastomer dispersion in the still aqueously wet state, with special provisions for avoiding loss of pigment in the aqueous serum and promoting uniformity of product in the masterbatch.

Thus the present invention, inter alia, provides a simple and efficient process for the curbing of silica pigment losses and the promotion of uniformity of product in the preparation of masterbatches of measured silica pigment content. As shown in the drawing, the first part of the process consists essentially in (A) providing an aqueously wet never dried hydrated silica pigment precipitate having a residual or bound alkali content (E) providing a quantity of water soluble oleophilic carboxylate material, and (D) with or without (w/wo) the addition from (B) of reactant selected from the water soluble acids and/or from (C) of water soluble colorless reactant materials capable of water insolubilizing the oleophilic carboxylate material, and which are selected from the members of the designated Groups (I) to (IV), combining the wet silica pigment from (A) with oleophilic carboxylate material from (E), to form an aqueously wet rubber dispersible hydrated silica pigment composition. The silica pigment composition so provided, when formed with the oleophilic carboxylate, with or without reactant from (C) and/or processing oil from (M), may be dried to yield useful dispersible dry silica pigment compositions as indicated at (F–1), and in any event, may be used, still without drying, in the second part of the masterbatching process, by combining the same, together with (G) a latex, i.e. aqueous dispersion, of the elastomer prepared with anionic emulsifier—with or without added carbon black and/or processing oil (M) (1)(2) with reactant from the designated class (C), as indicated at (H), and recovering the resulting coagulum as a masterbatch as indicated at (K) and (L). Under these conditions the steps prior to the recovery render the serum resulting from the coagulation essentially free of silica pigment, thus assuring a uniform silica pigment content in the masterbatch. The achievement of this desideratum is evidenced by the fact that when the coagulum is mechanically removed from the serum as indicated at (I), the serum (J) is found to be essentially free of silica pigment.

Useful processes and products provided by the invention are more fully described and exemplified by preferred embodiments hereinafter and are more particularly pointed out in the appended claims. In the following descriptions of and preferred embodiments, Examples 1 to 8 are embodiments of the first part of the over-all process of (a) preparing the oleophilic carboxylate treated aqueously wet silica pigment and (b) the masterbatch therefrom; Examples 9 to 19 and 28–40 are of embodiments of the over-all process; and Examples 20 to 27 and 40–44 are of the preparation of the dried dispersible silica pigment composition (F–1 in the drawing).

DESCRIPTION OF THE PREFERRED EMBODIMENTS

Preferred embodiments of the present invention avoid the use of organic additives such as tetraethylene pentamine, glue, gelatin, casein, etc., which increase the cost and may affect the curing properties of the masterbatch. The invention, inter alia, may be used to improve wet silica pigment masterbatching and masterbatches using any aqueously wet never dried hydrated silica pigment precipitate prepared by precipitation from an aqueous solution of alkali-metal silicate with the aid of carbon dioxide and containing bound alkali, and is applicable to the formation of masterbatches therewith with elastomer latices prepared with anionic emulsifier of the type coagulable with the water soluble acids and/or metal salts of the reactants (B) and (C).

The elastomer latices (i.e. aqueous dispersions) employed in the present invention include latices of diene homopolymer rubbers such as polybutadiene, polyisoprene, polychloroprene; those of diene copolymer and interploymer rubbers such as the copolymers and interpolymers of diene monomers and monomers containing and copolymerizable or graft polymerizable therewith through a single ethylenically unsaturated group, e.g. butadiene-styrene, butadiene-acrylonitrile, or methacrylonitrile, butadiene-acrylate or methacrylate ester; and those of rubbery copolymers and interpolymers of hydrocarbon monomers with polar vinylidene (including vinyl) monomers, and such latices may be mixed or combined with processing oils or their aqueous emulsions to form oil-rubber-silica masterbatches, and any of the foregoing may be combined with carbon black and its aqueous dispersions, providing the silica pigment comprises an essential component of the e.g. carbon black-elastomer-silica masterbatch.

Silica pigments containing residual alkali suitable for masterbatching in accordance with the present invention are usually precipitated by the gradual acidulation of aqueous sodium silicate solution, e.g. with the aid of carbon dioxide.

The term "water-soluble acids" as used herein designates the inorganic and organic acids which are water soluble both as free acids and in the form of alkali metal or ammonium salts. Examples of such acids are hydrochloric, sulfuric, nitric, phosphoric, formic, acetic, hydroxyacetic, the chloroacetic acids, propionic, oxalic, tartaric, citric, maleic, and the like.

The term "water soluble olephilic carboxylate material," as used herein, connotes the water soluble or water dispersible salts of long-chain carboxylic acids, such as the alkali metal and ammonium salts thereof, but does not include the carboxylic acid salts of amines, the employment of which forms the subject of a copending application. The term long-chain carboxylic acids designates the fatty acids and the rosin acids and derivatives thereof, which have from 1 to 10 carboxyl groups and a chain of from 8 to 36 carbon atoms attached to at least one carboxyl group thereof, and such long-chain carboxylic acids include, the individual fatty acids such as caprylic, capric, lauric, myristic, palmetic, stearic, oleic, linoleic, linolenic, abietic, hydroabietic, dehydroabietic, ricinoleic, and the like; the mixed fatty acids derived from vegetable oils such as coconut, palm, linseed, cottonseed, soya, tung, perilla, tall, corn, oiticica, and castor oils, and the like; the rosin and disproportionated rosin acids; the mixed fatty acids derived from animal fats such as tallow fatty acids;

the mixed fatty acids derived from fish oils, such as herring, menhadden, salmon and sardine oils, and the like; the dimers, trimers, and tetramers of the foregoing unsaturated fatty acids such as the dimer acids from bodied soya bean oil, the trimer acids from bodied linseed oil, and the dimers, trimers and tetramers of fish oil fatty acids; and derivatives of the foregoing such as the partially and totally hydrogenated, hydroxylated, oxidized, epoxidized, halogenated, cyanoated, sulfurated, styrenated, and maleated (maleic anhydride) fatty acids, and the like. The saturated carboxylate materials are preferred.

The term "water insoluble oleophilic carboxylate" designates the water insoluble aluminum and/or zinc and/or alkaline earth metal salts and/or the free acid and combinations thereof, derived from the water soluble oleophilic carboxylate material by treatment with reactant in the presence of the silica pigment.

Carbon black

By the term "carbon black" as used herein as meant any carbon blacks suitable for use by the rubber industry and set forth under the title "carbon blacks" at pages 251 to 264 of the publication entitled "Materials and Compounding Ingredients for Rubber," compiled by J. V. Del Gatto, published by Rubber World, 1968, and herein incorporated by reference, e.g. Philblack O (TM), Statex K (TM), Statex 160 (TM), Kosmobile 77 (TM), Thermax (TM), and the like.

Processing oils

The term "processing oils" as used herein is meant rubber processing material of both liquid and solid types (if required the solids types can be converted to the liquid state for us herein with the aid of solvent or plasticizer) and include the processing materials set forth under "Plasticers and Softeners" at pages 149 to 214 of the publication entitled "Materials and Compounding Ingredients for Rubber," complied by J. V. Del Gatto, published by Rubber World, 1968, and herein incorporated by reference and among the types of processing materials especially suitable for use in this invention are (a) the coal tar oils and pitches e.g. Bardol (TM), Bardol B (TM); (b) the asphalts, e.g. BRH #2 (TM); (c) the petroleum oils including the paraffinic, naphthenic, aromatic, and highly aromatic categories, which are commercially available under trademark designations, Sunpar (TM), Sundex (TM), Sunthene (TM), Circosol (TM), and Shellflux (TM) oils, and the like, such as Circosol 2XH (TM), Sundex 53 (TM), Shell SPX 97 (TM), Dutrex-20, -419, -726, -757, -787 (TM), and Califlux TT (TM) and other oils suitable for rubber compounding or the oil extension of synthetic rubber; (d) the coumarone-indene oils and resins, e.g. Cumar Resin RH, –P10, –T(TM); (e) the liquid ester type plasticizers, e.g. dibutyl phthalate, di-(2-ethylhexyl) phthalate, diglycol laurate, dibenzyl sebacate, tributoxyethyl phosphate, tricresyl phosphate and the like; (f) the phenol formaldehyde thermoplastic resins, e.g. Durez 12687, 12707 (TM) and the like; (g) the hydrocarbon resins, e.g. Neville–LX 782, –LX 125, (TM), Para-Flux, Para Resin 2457 (TM); (h) the hydrocarbon resincoumarone indene polymers, e.g. Picco Resins (TM); (i) the pine tars and pine tar oils, rosin and rosin oils, and tall oil and its derivatives, e.g. PT–101, PT–401, PT–800 (TM); and the like.

EXAMPLES

Silica preparation

The aqueously wet never dried alkaline silica pigment employed in all the examples was prepared in a manner similar to Example 9 of U.S. Pat. No. 3,250,594 except that the ratio of 41° Bé commercial sodium silicate $(Na_2O/(SiO_2)_{3.22})$ to water was approximately 1 to 4.5 by weight. The carbon dioxide was supplied to the sodium silicate with the aid of a single submerged combustion burner up to the appearance of the Tyndall effect and with two such burners thereafter. The use of the submerged combustion burners was according to U.S. Pat. No. 3,372,046. The silica product was filtered and washed to reduce the soluble salts to the range of 1 to 2% by weight or less based on the dry solids and the filter cake had a solids of approximately 10% by weight. The resulting aqueously wet silica pigment was designated wet alkaline silica pigment-I, and had a bound and residual alkali content of about 1.5% by weight as $Na_2O$, and a serum pH of about 8.5 (8.5 to 9.5).

A portion of this alkaline silica filter cake was slurried with about a half volume of water and was acidified to a pH of 4.5 with dilute sulfuric acid and as a filter cake, with washing to a filtrate pH of about 7 to 7.5, had a solids of approximately 10% by weight. The resulting aqueously wet silica slurry was designated wet silica pigment-II.

The just described filter cakes having a solids content of about 10% by weight are embraced within the term "wet silica pigment" (which herein connotes aqueously wet silica pigment) as are wet pigments of more reduced water content which can be prepared by pressing the said filter cakes, or of augmented water content, e.g. slurries having less than 10% solids content, and the terms "aqueously wet silica pigment" or "aqueously wet state," as employed herein are generic to all such conditions. Thus these terms as employed herein embrace aqueously wet silica pigment materials having a solids content in the range of about 1% to about 65% solids, dry basis, by weight; however, for economy in the practice of the invention wet silica pigments of reduced water content (solids content 8 to 36%) are preferred.

To determine pigment quality a portion of wet silica pigment-II was dried at 105° C., micropulverized and compounded as set forth in Table I hereof.

TABLE I

| Compound ingredients: | Quantities (pts. wt.) |
|---|---|
| Butadiene-styrene copolymer [1] | 100 |
| Silica pigment-II dried | 60 |
| Antioxidant, 2,2 - methylene-bis(4-methyl-6-t.-butylphenol) | 2.0 |
| Magnesium oxide | 4.0 |
| Paracoumarone-indene resin [2] | 10.0 |
| Zinc oxide | 1.0 |
| N-tert-butyl-2-benzothiazole-sulphenamide | 0.75 |
| N,N'-di-o-tolylguanidine | 1.5 |
| Triethanolamine | 1.0 |
| Phthalic anhydride | 0.75 |
| Sulfur | 2.25 |

[1] SBR 1502.
[2] Cumar Resin RH, a trademark product of Allied Chemical Corp.

The compound was aged over-night, re-milled and cured for 45 minutes at 287° F.

The physical test data for the vulcanizate so prepared with the foregoing silica pigment is set forth in Table II hereof.

TABLE II

Silica tested (in vulcanizate) Silica Pigment-II:
| | |
|---|---|
| Hardness (Shore A) | 72 |
| Tensile (p.s.i.) | 3530 |
| Modulus (300%) | 1140 |
| Elong. (percent) | 575 |

In Examples 9–15 and 17–19 the elastomer latex and the prepared slurry of oleophilic carboxylate deposit treated silica pigment were blended together by low speed stirring before combining them with the coagulant. In Examples 9–15 while still stirring, the coagulant-aqueous solution was progressively added at a rate enabling it to be mixed in without producing local coagulation, until coagulation throughout the mixture occurred, and on separation of the coagulum from the aqueous phase the serum was essentially free of silica pigment.

In the case of Examples 17–19, the blended polymer latex and treated aqueous silica pigment slurry were run into the coagulating solution while stirring, and this procedure also yielded a coagulum comprising essentially all of the elastomer and silica pigment, leaving the serum completely or essentially free of the pigment.

It has also been found that streams of the elastomer latex, the treated silica pigment slurry, and the coagulant, as illustrated in Example 16, can be run concurrently into the coagulation vessel while stirring, and that this procedure also will yield a coagulum containing essentially all of the silica pigment, leaving essentially no silica pigment in the aqueous phase. Thus the processes of the examples are adaptable for either continuous or batch production of the masterbatch. In those instances in which an oil-rubber-silica pigment masterbatch is desired, up to about 45% of oil based on the elastomer is added to the latex prepared with anionic emulsifier according to the foregoing examples, if desired with a small amount of ammonium hydroxide to aid dispersion of the oil into the elastomer, and it will thus be understood that the masterbatch and elastomer dispersion contemplated by the invention may contain a minor proportion of oil. Similarly in the examples any soluble aluminum salt may be substituted for the hydrated aluminum sulfate, e.g. aluminum ammonium sulfate or aluminum sodium sulfate, and the coagulant solution contemplated by the invention may thus comprise minor amounts of ammonium and/or alkali metal salts without detriment to the process. Furthermore the elastomer latex and/or the aqueous dispersion of silica pigment and/or the aqueous coagulant solution may contain a small proportion of ammonium hydroxide which appears in certain instances to facilitate practice of the invention. When carbon black is also to be included in the elastomer-silica pigment masterbatch, it may be incorporated as an aqueous slurry along with the slurry of the silica pigment.

In the following tabulations of Examples 1 through 44 the ingredients (A), (B), (C), etc., are listed in the order of their addition, except where otherwise specifically set forth. These examples were carried out at ambient temperatures, however, more elevated temperatures may be employed, e.g. to accelerate the processing. In these examples, there is combined with (a) an aqueously wet hydrated silica pigment precipitate which has a bound alkali content in the range of 0.1 to 10% by weight as $Na_2O$; which has been prepared by precipitation from an aqueous solution of alkali-metal silicate with the aid of carbon dioxide; and which has continuously been maintained in an aqueously wet state without having been dried therefrom after its precipitation; (b) from 0.3 to 20%, based on the pigment, dry basis by weight, of water soluble oleophilic carboxylate material and sufficient reactant from the class consisting of water soluble acids and water soluble salts of aluminum and/or zinc and/or alkaline earth metals, to react with the alkali content of the pigment and to form a deposit on the pigment by water insolubilizing said oleophilic carboxylate material, thereby to form a wet pigment composition; (c) such wet pigment composition, in any of the examples may be combined from 0 to 45 parts of processing oil per 100 parts of the pigment, dry basis by weight, and, (as exemplified particularly in Examples 20 to 27 and 41 to 44); (d) recovering and drying of the solids therefrom yields a dry hydrated silica pigment composition suitable for dry dispersion in elastomer compounding. The addition of the oil after step (F) in the drawing is advantageous as the oil is then readily distributed in a most uniform manner throughout the water insoluble oleophilic carboxylate treated silica pigment composition, and drying thereof yields a uniform product with even more reduced tendency to dust as well as augmented dispersibility in dry elastomers and augmented bulk density.

TABLE III.—PREPARATION OF TREATED SILICA SLURRY
(Parts by wt.)

| Example No. | 1 | 2 | 3 | 4 |
|---|---|---|---|---|
| (A) Silica pigment slurry: Alkaline silica pigment-I: | | | | |
| Quantity, wet | 2,000 | 2,000 | 2,000 | 2,000 |
| Dry solids basis | 200 | 200 | 200 | 200 |
| pH | 8.5 | 8.5 | 8.5 | 8.5 |
| Water | 150 | 150 | 150 | 150 |
| (B) Oleophilic surfactant-carboxylate aqueous solution: | | | | |
| 20% sodium salt of disproportionated rosin acid [1] | 100 | | | |
| 5% sodium stearate | | 200 | 200 | 200 |
| (C) Reactant-aqueous solution: | | | | |
| 10% aluminum sulfate [2] | [3] 145 | 125 | | |
| 10% zinc sulfate | | | 175 | |
| 10% calcium chloride | | | | 100 |
| After reactant added, pH | 4.5 | 4.5 | 6.2 | 7.6 |
| (D) Treated silica-wet cake: | | | | |
| Filter and wash (X) | X | X | X | X |
| Filter cake solids, percent | 13.9 | 12.6 | 13.2 | 13.1 |

[1] Dresinate 731, a trademark product.
[2] Aluminum sulfate: $Al_2(SO_4)_3 \cdot 14H_2O$.
[3] ⅓ reactant added before Step (B).

NOTE: The aqueous alkaline silica slurry was placed in a glass container and moderately agitated, then the water was added followed by the carboxylate solution and then the aqueous reactant solution was added slowly while agitating except as noted in Example 1.

TABLE IV.—PREPARATION OF TREATED SILICA SLURRY
(Parts by wt.)

| Example No. | 5 | 6 | 7 | 8 |
|---|---|---|---|---|
| (A) Silica pigment slurry: Alkaline silica pigment-I: | | | | |
| Quantity, wet | 2,000 | 2,000 | 2,000 | 2,000 |
| Dry solids basis | 200 | 200 | 200 | 200 |
| pH | 8.5 | 8.5 | 8.5 | 8.5 |
| (B) Reactant-aqueous solution: | | | | |
| 10% sulfuric acid | | | 70 | 70 |
| pH | | | 5.0 | 5.0 |
| Water | | | 150 | 150 |
| (C) Olephilic carboxylate-aqueous solution: | | | | |
| 5% sodium stearate | 200 | 200 | 20 | 40 |
| (D) Reactant-aqueous solution: | | | | |
| 10% magnesium sulfate | 115 | | | |
| 10% barium chloride | | 180 | | |
| 10% aluminum sulfate [1] | | | 50 | 50 |
| After reactant added pH | 7.2 | 7.0 | 4.5 | 4.5 |
| (E) Treated silica slurry-wet filter cake: | | | | |
| Filter and wash (X) | X | X | X | X |
| Filter cake solids, percent | 13.5 | 13.4 | 12.5 | 12.4 |

[1] Aluminum sulfate: $Al_2(SO_4)_3 \cdot 14H_2O$.

NOTE.—The aqueous alkaline silica slurry was placed in a glass container and moderately agitated, then the water was added followed by the carboxylate solution and then the aqueous reactant solution was added slowly while agitating, except that a part of the selected reactant material was added to the pigment slurry ahead of its combination with the carboxylate in Examples 7 and 8.

TABLE V.—POLYMER-SILICA MASTERBATCH
(Parts by wt.)

| Example No. | 9 | 10 | 11 | 12 |
|---|---|---|---|---|
| (A) Polymer latex: | | | | |
| Butadiene-styrene [1] | 560 | 560 | 560 | 560 |
| Dry solids basis | 100 | 100 | 100 | 100 |
| Antioxidant [2] | 2 | 2 | 2 | 2 |
| Water | 520 | 520 | 520 | 520 |
| (B) Oleophilic carboxylate treated silica slurry-wet filter cake (prepared from never dried alkaline silica precipitate prepared in accordance with)— | | | | |
| Example 1 (Table III) | 360 | | | |
| Example 2 (Table III) | | 400 | | |
| Example 3 (Table III) | | | 380 | |
| Example 4 (Table III) | | | | 384 |
| Dry solids basis | 50 | 50 | 50 | 50 |
| Water | 200 | 200 | 200 | 200 |
| 7% aqueous ammonia | | | | 8 |
| (C) Reactant-Aqueous Solution:[3] | | | | |
| 2% aluminum sulfate [4] | 120 | 136 | | |
| 2% zinc sulfate | | | 192 | |
| 2% calcium chloride | | | | 185 |
| (D) Coagulation: | | | | |
| To treated silica (B) plus polymer latex (A) the reactant (C) was added (X) | X | X | X | X |
| pH serum | 4.5 | 4.5 | 6.4 | 6.8 |
| Silica in serum | None | None | None | None |
| (E) Masterbatch: | | | | |
| Filter and wash (X) | X | X | X | X |
| Dried (105° C.) (X) | X | X | X | X |

[1] SBR-1502 (dry solids 19.7%).
[2] The antioxidant is 2,2'-methylene-bis(4-methyl-6-t-butylphenol).
[3] After combining the polymer latex and treated silica slurry and while moderately agitating the metal salt solution was added to complete the coagulation.
[4] Aluminum sulfate: $Al_2(SO_4)_3 \cdot 14H_2O$.

TABLE VI.—POLYMER-SILICA MASTERBATCH
(Parts by wt.)

| Example No | 13 | 14 | 15 | 16 |
|---|---|---|---|---|
| (A) Polymer latex: | | | | |
| Butadiene-styrene [1] | 510 | | | |
| Chloroprene [2] | | 173 | | |
| Butadiene-acrylonitrile [3] | | | 244 | |
| Butadiene-acrylonitrile [4] | | | | 254 |
| Dry solids basis | 100 | 100 | 100 | 100 |
| Antioxidant [5] | 2 | 2 | 2 | 2 |
| Water | 520 | 500 | 500 | 500 |
| (B) Oleophilic carboxylate treated silica slurry-wet filter cake (Prepared from never dried alkaline silica pigment precipitate in accordance with)— | | | | |
| Example 5 (Table IV) | 370 | | | |
| Example 6 (Table IV) | | 370 | | |
| Example 7 (Table IV) | | | 400 | |
| Example 8 (Table IV) | | | | 400 |
| Dry solids basis | 50 | 50 | 50 | 50 |
| Water | 200 | 200 | 200 | 200 |
| 7% aqueous ammonia | 32 | | 32 | 32 |
| (C) Reactant-aqueous solution: [6] | | | | |
| 2% magnesium sulfate | 160 | | | |
| 2% barium chloride | | 280 | | |
| 2% aluminum sulfate | | | 480 | 480 |
| (D) Coagulation: | | | | |
| To treated silica (B) plus polymer latex (A) reactant (C) was added—(X) | X | X | X | X |
| pH serum | 7.6 | 8.0 | 6.0 | 6.0 |
| Silica in serum | None | None | None | None |
| (E) Masterbatch: | | | | |
| Filter and wash (X) | X | X | X | X |
| Dried (105° C.) (X) | X | X | X | X |

[1] SBR 1502 (dry solids 19.7%).
[2] Neoprene 635 (dry solids 58%), a trademark product.
[3] Hycar 1561 (dry solids 41.1%), a trademark product.
[4] Hycar 1570 X 20 (a trademark product), a carboxy group containing polymer (dry solids 39.7%).
[5] The antioxidant is 2,2'-methylene-bis(4-methyl-6-t-butylphenol).
[6] After combining the polymer latex and treated silica slurry and while moderately agitating the alkali earth metal salt solution was added to complete the coagulation.
[7] Aluminum sulfate: $Al_2(SO_4)_3 \cdot 14H_2O$.

TABLE VII.—POLYMER-SILICA MASTERBATCH
(Parts by wt.)

| Example No | 17 | 18 | 19 |
|---|---|---|---|
| (A) Silica pigment slurry: | | | |
| Alkaline silica pigment-I | 500 | 500 | 500 |
| Dry solids basis | 50 | 50 | 50 |
| pH | 8.5 | 8.5 | 8.5 |
| (B) Acid reactant-aqueous solution: | | | |
| 10% sulfuric acid | 17 | 17 | 17 |
| pH | 5.0 | 5.0 | 5.0 |
| Water | 50 | 50 | 50 |
| (C) Metal salt reactant-aqueous solution: | | | |
| 10% aluminum sulfate [1] | 25 | | |
| 10% magnesium chloride | | 60 | |
| 10% calcium chloride | | | 60 |
| (D) Oleophilic carboxylate-aqueous solution: | | | |
| 5% sodium oleate | 50 | 50 | 50 |
| 28% ammonia | 5 | 5 | 5 |
| Water | 50 | 50 | 50 |
| (E) Polymer latex: | | | |
| Butadiene-styrene [2] | 508 | 508 | 508 |
| Dry solids basis | 100 | 100 | 100 |
| Antioxidant [3] | 2 | 2 | 2 |
| Water | 500 | 500 | 500 |
| (F) Reactant-aqueous solution: | | | |
| 10% aluminum sulfate [1] | 25 | | |
| 10% magnesium sulfate | | 80 | |
| 10% calcium chloride | | | 60 |
| (G) Coagulation: | | | |
| Treated silica (A), (B), (C), (D) plus polymer latex (E) added to reactant (F)—(X) | X | X | X |
| pH serum | 4.0 | 7.6 | 7.4 |
| Silica in serum | None | None | None |
| (H) Masterbatch: | | | |
| Filter and wash (X) | X | X | X |
| Dried (105° C.) (X) | X | X | X |

[1] Aluminum sulfate: $Al_2(SO_4)_3 \cdot 14H_2O$.
[2] SBR-1502 (dry solids 19.7%).
[3] The antioxidant is 2,2'-methylene-bis(4-methyl-6-t-butylphenol).

TABLE VIII.—DISPERSIBLE SILICA PIGMENT
(Parts by wt.)

| Example No | 20 | 21 | 22 | 23 |
|---|---|---|---|---|
| (A) Silica pigment slurry: | | | | |
| Alkaline silica pigment-I (pH=8.5–9.5) | 150 | 150 | 150 | 150 |
| Dry solids basis | 15 | 15 | 15 | 15 |
| Water | 50 | 50 | 50 | 50 |
| (B) Oleophilic carboxylate-aqueous solution: | | | | |
| 5% potassium stearate | 7.5 | 15 | 22.5 | 30 |
| (C) Reactant-aqueous solution: | | | | |
| 2% aluminum sulfate [1] | 58 | | | |
| 2% zinc sulfate | | 46 | | |
| 2% calcium chloride | | | 31 | |
| 2% magnesium sulfate | | | | 35 |
| (D) Combine (A) with (B) then add (C): | | | | |
| Blend, (X) | X | X | X | X |
| (E) Treated silica: | | | | |
| Filter and wash (X) | X | X | X | X |
| Dried (105° C.) (X) | X | X | X | X |

[1] Aluminum sulfate: $Al_2(SO_4)_3 \cdot 14H_2O$.

TABLE IX.—DISPERSIBLE SILICA PIGMENT
(Parts by wt.)

| Example No | 24 | 25 | 26 | 27 |
|---|---|---|---|---|
| (A) Silica pigment slurry: | | | | |
| Alkaline silica pigment-I (pH 8.5–9.5) | 150 | 150 | 150 | 150 |
| Dry solids basis | 15 | 15 | 15 | 15 |
| Water | 50 | 50 | 50 | 50 |
| (B) Oleophilic carboxylate-aqueous solution: | | | | |
| 10% sodium abietate | 7.5 | 7.5 | 7.5 | 7.5 |
| (C) Reactant-aqueous solution: | | | | |
| 2% aluminum sulfate [1] | 30 | | | |
| 2% zinc sulfate | | 45 | | |
| 2% magnesium chloride | | | 35 | |
| 2% barium chloride | | | | 65 |
| 2% sulfuric acid | 15 | | | |
| (D) Combine (A) with (B) then add (C): | | | | |
| Blend, (X) | X | X | X | X |
| (E) Treated silica: | | | | |
| Filtered and washed (X) | X | X | X | X |
| Dried (105° C.) (X) | X | X | X | X |

[1] Aluminum sulfate: $Al_2(SO_4)_3 \cdot 14H_2O$

The invention has still further disclosed that by employing augmented amounts of the oleophilant, significantly in excess of those which avoid loss of silica when masterbatching, a dry silica pigment may be obtained which is readily dispersible, and which does not itself impart high modulus to the stocks, but which does impart an improved balance of tensile strength and tear or abrasion resistance to the vulcanizate. And in this connection, the invention has further disclosed that a vulcanizate combining high modulus, high tensile strength and high tear or abrasion resistance, can be provided by employing a combination of dry silica pigment bearing such augmented amounts of oleophilic deposit, together with other reinforcing fillers, e.g. carbon black and/or dry silica pigments having less than such augmented amounts of the oleophilic carboxylate deposit thereon.

Examples 28–40 and 41–44

Polymer-silica masterbatches may also be prepared containing processing oils and/or carbon black as previously described, without departing from the invention. In such practice, from 0 to 65 parts by weight of carbon black may be employed (with the limitation that the total quantity of silica pigment and carbon black, dry basis, not exceed 100 parts by weight, per 100 parts of the elastomers) and/or from 0 to 45 parts by weight of processing oil may be employed, by combining with the elastomer latex and silica pigment slurry prior to the coagulation thereof by the aqueous coagulant as set forth in the drawing. Such combinations may be effected in any suitable way, e.g. the carbon black may be added as an aqueous slurry and the processing oil as an aqueous dispersion preferably with an anionic emusifying agent and/or ammonium hydroxide. The carbon black may be any commercial carbon black suitable for rubber compounding, e.g. the trademarked blacks; Philblack O, Statex K, Thermax, Kosmobile 77, or the like, and may be slurried with the aid of an anionic dispersing agent; and the processing oil may be any of the processing oils suitable for use in rubber compounding, e.g. petroleum oils of the naphthenic, aromatic, and highly aromatic categories, which are commercially available under trademark designations, such as Circosol 2XH, Sundex 53, Shell SPX97, Dutrex 20, and Califlux TT, and other oils suitable for rubber compounding or the oil-extension of synthetic rubber, among which are the predominantly aromatic Sundex (TM) and Shell Dutrex (TM) oils, and the predominantly paraffinic or naphthenic Sunpar (TM), Sunthene (TM), Circosol (TM), and Shellflux (TM) oils, and the like.

The following Examples 28–40 are illustrative of such modes of practicing the invention, and Examples 41–44 are illustrative of the preparation of dispersible silica pigments including processing oil in accordance with the invention, the procedure of which are applicable to such preparation by drying the treated silica pigments resulting from step (F) of the drawing, as produced in any of the other examples, with or without the prior dispersion of processing oil (M) thereinto.

TABLE X.—POLYMER-SILICA MASTERBATCHES
[Including processing oil and/or carbon black (parts by wt.)]

| Example | 28 | 29 | 30 | 31 |
|---|---|---|---|---|
| (A) Silica pigment slurry: | | | | |
| Alkaline silica pigment-I (pH 8.5) | 650 | 200 | 200 | 150 |
| Dry solids basis | 65 | 20 | 20 | 15 |
| Water | 800 | 250 | 250 | 200 |
| (B) Acid reactant-aqueous solution: | | | | |
| 10% sulfuric acid | 22 | 6.8 | 6.8 | 5.1 |
| Silica slurry, pH (Filter cake after washing) | 7 | 7 | 7 | 7 |
| (C) Oleophilic carboxylate-aqueous solution: | | | | |
| Stearic acid | 1.5 | 0.5 | 0.5 | 0.5 |
| 28% aqueous ammonia | 0.3 | 0.2 | 0.2 | 0.2 |
| Water | 30 | 15 | 15 | 15 |
| (D) Combine (A) and (B) and (C) (X) | X | X | X | X |
| (E) Reactant-aqueous solution: | | | | |
| 2% aluminum sulfate [1] | 65 | 22 | 22 | 22 |
| (F) Carbon balck-processing oil: | | | | |
| (a) carbon black: | | | | |
| Carbon black [2] | | 45 | 45 | 40 |
| 28% aqueous ammonia | | 0.3 | 1.0 | 1.0 |
| Water | | 400 | 450 | 400 |
| Blender high shear (X) | | X | X | X |
| (b) Processing oil: | | | | |
| Processing oil [3] | 20 | 20 | 20 | |
| Stearic acid | | | 1 | |
| Oleic acid | | | | 1 |
| 28% aqueous ammonia | 2 | | | |
| Combine (a) and (b) and blend [4] (X) | | X | X | |
| (G) Polymer latex: | | | | |
| Butadiene-styrene [5] | 510 | 510 | 510 | 510 |
| Dry solids basis | 100 | 100 | 100 | 100 |
| Antioxidant [6] | 2 | 2 | 2 | 2 |
| Water | 500 | 500 | 500 | 500 |
| (H) Combine (D) and (E) then (F) and (G) (X) | X | X | X | X |
| (I) Reactant-aqueous solution: | | | | |
| 2% aluminum sulfate [7] | 230 | 210 | 240 | 230 |
| Water | 1,500 | 1,500 | 1,500 | 1,500 |
| (J) Coagulation: | | | | |
| Combine (H) and (I) (X) | X | X | X | X |
| pH of serum | 4.5 | 4.5 | 4.5 | 4.5 |
| Silica and/or black in serum | None | None | None | None |
| (K) Masterbatch: | | | | |
| Filtered and washed (X) | X | X | X | X |
| Dried (105° C.) (X) | X | X | X | X |

[1] Aluminum sulfate=$Al_2(SO_4)_3 \cdot 14H_2O$.
[2] Statex K, a trademark product.
[3] Sundex 2XH, a trademark product.
[4] Waring Blendor, a trademark product.
[5] SBR-1502 latex (T.S.=19.7%).
[6] Antioxidant is 2,2'-methylene-bis-(4-methyl-6-t.-butylphenol).
[7] Aluminum sulfate=$Al_2(SO_4)_3 \cdot 14H_2O$.

TABLE XI.—POLYMER-SILICA MASTERBATCHES
[Including carbon black and processing oil (parts by wt.)]

| Example | 32 | 33 | 34 | 35 | 36 |
|---|---|---|---|---|---|
| (A) Silica pigment slurry: | | | | | |
| Alkaline silica pigment-I (pH=8.5–9.5) | 25 | 25 | 25 | 25 | 25 |
| Dry solids basis | 2.5 | 2.5 | 2.5 | 2.5 | 2.5 |
| Water | 60 | 60 | 60 | 60 | 60 |
| (B) Oleophilic carboxylate-aqueous solution: | | | | | |
| 5% sodium tallow soap | 4.0 | | | | |
| 5% potassium rosin soap | | 3.5 | | | |
| 5% ammonium coco fatty acid soap | | | 2.0 | 4.0 | 4.0 |
| (C) Reactant-aqueous solution: | | | | | |
| 2% aluminum sulfate [1] | 19 | 19 | 19 | 23 | 23 |
| 5.6% aqueous ammonia | | | | 1.0 | 1.0 |
| (D) Combine (A) and (B) and (C) (X) | X | X | X | X | X |
| (E) Carbon black-processing oil: | | | | | |
| Philblack O [2] | 5 | | | 7.5 | 7.5 |
| Statex 160 HR [2] | | 2.5 | 5.0 | | |
| Sundex 2XH [3] | 1.0 | | | 1.0 | 1.0 |
| (F) Combine (D) and (E): Blend [4] (X) | X | X | X | X | X |
| (G) Polymer latex: | | | | | |
| Butadiene-styrene [5] | 82 | 55 | 82 | 109 | 109 |
| Dry solids basis | 15 | 10 | 15 | 20 | 20 |
| Antioxidant [6] | 0.3 | 0.2 | 0.3 | 0.4 | 0.4 |
| Water | 85 | 55 | 85 | 110 | 110 |
| (H) Reactant-aqueous solution: | | | | | |
| 2% aluminum sulfate [1] | 32 | 24 | | | |
| 2% zinc sulfate | | | 36 | | |
| 2% calcium chloride | | | | 48 | |
| 2% magnesium sulfate | | | | | 40 |
| (I) Combine (F) and (G) then (H) (X) | X | X | X | X | X |
| pH of serum | 4.5 | 5.5 | 6.8 | 7.0 | 7.5 |
| Silica and/or black in serum | None | None | None | None | None |
| (J) Masterbatch: | | | | | |
| Filter and wash (X) | X | X | X | X | X |
| Dried (105° C.) (X) | X | X | X | X | X |

[1] Aluminum sulfate $Al_2(SO_4)_3 \cdot 14H_2O$.
[2] Carbon black, a trademark product.
[3] Processing oil, a trademark product.
[4] Waring Blendor, a trademark product.
[5] SBR-1502 latex (TS=18.4%).
[6] The antioxidant is 2,2'-methylene-bis-(4-methyl-6-t.-butyl phenol).

TABLE XII.—POLYMER-SILICA MASTERBATCHES
[Including carbon black and processing oil (parts by wt.)]

| Example | 37 | 38 | 39 | 40 |
|---|---|---|---|---|
| (A) Silica pigment slurry: | | | | |
| Alkaline silica pigment-I pH=8.5–9.5 | 25 | 25 | 25 | 25 |
| Dry solids basis | 2.5 | 2.5 | 2.5 | 2.5 |
| Water | 60 | 60 | 60 | 60 |
| (B) Reactant-aqueous solution: | | | | |
| 2% aluminum sulfate [1] | | 8.5 | | |
| 2% calcium chloride | | | 5.0 | |
| 2% magnesium sulfate | | | | 5.5 |
| (C) Anionic surfactant-carboxylate type: | | | | |
| Coco fatty acids | 0.2 | | | |
| Disproportionated rosin acid soap [2] | | 0.2 | 0.2 | 0.2 |
| 5.6% aqueous ammonia | 1.0 | | | |
| (D) Combine (A) and (B) then (C): Blend [3] | *0.5 | *0.5 | *0.5 | *0.5 |
| (E) Carbon black and processing oil: | | | | |
| Philblack O [4] | 7.5 | | | |
| Statex 160 HR [4] | | 5.0 | | |
| Thermax 4 | | | 5.0 | 5.0 |
| Sundex 2XH [5] | 1.0 | | | |
| (F) Combine (D) and (E): Blend [3] | *0.5 | *0.5 | *0.5 | *0.5 |
| (G) Polymer latex: | | | | |
| Polychloroprene [6] | 34.5 | | | |
| Butadiene-acrylonitrile [7] | | 36.5 | | |
| Butadiene-styrene [8] | | | 82 | 82 |
| Dry solids basis | 20 | 15 | 15 | 15 |
| Antioxidant [9] | 0.4 | 0.3 | 0.3 | 0.3 |
| Water | 35 | 35 | 85 | 85 |
| (H) Reactant-aqueous solution: | | | | |
| 2% zinc sulfate | 40 | | | |
| 2% aluminum sulfate [1] | | 32 | | |
| 2% calcium chloride | | | 18 | |
| 2% magnesium sulfate | | | | 16 |
| (J) Combine (I) and (H): | | | | |
| Blend [3] | *0.5 | *0.5 | *0.5 | *0.5 |
| pH of serum | 6.5 | 4.5 | 7.0 | 7.0 |
| (K) Masterbatch: | | | | |
| Filter and wash (X) | X | X | X | X |
| Dried (105° C.) (X) | X | X | X | X |

[1] Aluminum sulfate $Al_2(SO_4)_3 \cdot 14 H_2O$
[2] Dresinate 731, a trademark product.
[3] Waring Blendor, a trademark product.
[4] Carbon black a trademark product.
[5] Processing oil, a trademark product.
[6] Neoprene 635 latex (TS=58%), a trademark product.
[7] Hycar 156 latex (TS=41%), a trademark product.
[8] SBR-1502 latex (TS=18.4%).
[9] The antioxidant is 2,2'-methylene-bis-(4-methyl-6-t.-butyl phenol).
* Minutes.

TABLE XIII.—DISPERSIBLE SILICA PIGMENT
[Including processing oil (parts by wt.)]

| Example | 41 | 42 | 43 | 44 |
|---|---|---|---|---|
| (A) Silica pigment slurry: | | | | |
| Alkaline silica pigment-I (pH=8.5-9.5) | 150 | 150 | 150 | 150 |
| Dry solids basis | 15 | 15 | 15 | 15 |
| Water | 100 | 100 | 100 | 100 |
| (B) Oleophilic carboxylate-aqueous solution: | | | | |
| 10% sodium oleate | 3.0 | 7.5 | | |
| 10% sodium abietate | | | 7.5 | 15 |
| (C) Reactant-Aqueous solution: | | | | |
| 2% aluminum sulfate [1] | 60 | | | |
| 2% zinc sulfate | | 50 | | |
| 2% calcium chloride | | | 35 | |
| 2% sulfuric acid | | | | 33 |
| (D) Combine (A) and (B) and add (C): | | | | |
| Blend, (X) | X | X | X | X |
| Filter and wash (X) | X | X | X | X |
| (E) Processing oil: | | | | |
| Circosol 2XH [2] | 0.75 | 1.5 | | |
| Sundex 53 [2] | | | 3.0 | |
| Dutrex 20 [2] | | | | 3.5 |
| 28% aqueous ammonia | | | | 0.3 |
| (F) Combine (D) and (E): Blend, (X) | X | X | X | X |
| (G) Masterbatch: Dried (105° C.) | X | X | X | X |

[1] Aluminum sulfate $Al_2(SO_4)_3 \cdot 14H_2O$.
[2] Processing oil, a trademark product.

The masterbatches prepared in accordance with the present invention may be compounded with vulcanizing ingredients and vulcanized by any suitable recipe (e.g. the recipe set forth in Table I, above) to form useful vulcanizates.

From the foregoing disclosure, it will be appreciated, inter alia, that the present invention improves elastomer-silica pigment masterbatches by employing silica pigments combined with specified materials to improve the compatability of the said pigments with elastomer materials in general.

In certain co-pending applications filed concurrently herewith, different modes of improving elastomer-silica pigment masterbatches are provided by employing elastomers supplied with certain substituent groups improving the compatability of the elastomers with the aqueously wet silica pigments.

To maintain clear lines of division between the copending applications, the claims of this application recite, and rely for patentability on, only its own improvements, without prejudice to their applicability to processes or products employing such improvements along with a different improvement disclosed in one of said co-pending applications.

Also, while there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

I claim:

1. A process for the curbing of silica pigment losses and the promotion of uniformity of product in the preparation of a silica pigment-elastomer masterbatch from
   (a) aqueously wet hydrated silica pigment, and
   (b) an elastomer;
   which process comprises the steps of:
   (c) providing an aqueous dispersion containing (1) 100 parts by weight of the elastomer and (2) from 0.5 to 15 parts by weight of anionic dispersing agent;
   (d) providing 5 to 75 parts by weight, dry basis, of aqueously wet hydrated silica pigment precipitate which has a bound alkali content in the range of 0.1 to 10% by weight as $Na_2O$; which has been prepared by precipitation from an aqueous solution of alkali metal silicate with the aid of carbon dioxide; and which has continuously been maintained in an aqueous phase without having been dried after its precipitation;
   (e) providing a quantity of from 0.1 to 20%, dry weight, based on the silica pigment referred to in step (d), of water soluble oleophilic carboxylate material selected from the group consisting of alkali metal and ammonium salts of carboxylic acid;
   (f) providing a supply of reactant material selected from the water soluble acids;
   (g) providing a supply of reactant material selected from the class consisting of the members of the following groups: Group (I) the water soluble salts of aluminum or zinc; Group (II) the water soluble salts of the alkaline earth metals; Group (III) combinations of members of Groups (I) or (II) with a minor proportion by weight of water soluble acid; and Group (IV) combinations of 2 or more members selected from Groups (I), (II) and (III);
   (h) combining the wet silica pigment provided by step (d) with reactant material selected from those provided in steps (f) and (g) in an amount in the range of from 0 to a stoichiometric equivalent of the alkalinity of the said pigment, thereby providing a wet silica pigment for use in step (i);
   (i) combining the wet silica pigment provided by step (h) with the water soluble oleophilic carboxylate provided by step (e) and with sufficient of the reactant provided by step (g) to cause deposition of water insoluble oleophilic carboxylate therefrom on the silica pigment;
   (j) combining with the oleophilic wet silica pigment prepared by step (i), (I) the aqueous dispersion of elastomer provided by step (c), (II) from 0 to 75 parts by weight of carbon black with the limitation that the total of silica pigment and carbon black, dry basis, not exceed 80 parts by weight and (III) from 0 to 45 parts by weight of processing oil, and (IV) sufficient of the reactant material provided in step (g) to cause coagulation of the solids of the combination, whereby there is formed a coagulum of such solids rendering the aqueous serum of the combination essentially free of silica pigment; and
   (k) recovering the coagulum as a masterbatch.

2. A process as claimed in claim 1 wherein at least a part of the reactant employed to cause coagulation of the solids in step (j) is supplied as excess in the practice of step (i).

3. A process as claimed in claim 1 wherein at least a part of the reactant employed to cause deposition of water insoluble carboxylate in step (i) is supplied as a stoichiometric excess in step (h).

4. A process as claimed in claim 1 wherein the reactant material employed in step (h) comprises, about said stoichiometric amount of reactant provided in step (f).

5. A process as claimed in claim 1 wherein steps (h), (i) and (j) are practiced by running together streams of the materials employed in such steps in the order referred to therein.

6. A process as claimed in claim 1, in which the aqueous dispersion of polymer provided in step (c) is a dispersion prepared by aqueous emulsion polymerization of monomer material containing and polymerizable through at least one ethylenically unsaturated group.

7. A process as claimed in claim 6, in which at least 5 parts by weight of carbon black are employed in step (j).

8. A process as claimed in claim 6, in which at least 5 parts by weight of processing oil are employed in step (j).

References Cited
UNITED STATES PATENTS

| | | | |
|---|---|---|---|
| 2,047,128 | 7/1936 | Park | 106—308 N |
| 2,236,296 | 3/1941 | Minich et al. | 134—57 |
| 2,607,753 | 8/1952 | Adams | 260—41 |
| 2,635,057 | 4/1953 | Jordan | 106—308 N |
| 2,821,232 | 1/1958 | Wolf | 152—330 |
| 3,172,726 | 3/1965 | Burke et al. | 23—182 |
| 3,250,594 | 5/1966 | Burke et al. | 23—182 |
| 3,392,140 | 7/1968 | Maahs et al. | 260—41.5 |

OTHER REFERENCES

Whitby, G. S., Synthetic Rubber, John Wiley & Sons, Inc., New York, 1954, pp. 670 and 677.

Morton, M., Introduction to Rubber Technology, Reinhold Pub. Corp., New York, 1959, pp. 169–171.

Patton, Temple C., Paint Flow and Pigment Dispersion, Interscience Pub., New York, 1964, pp. 249–258.

MORRIS LIEBMAN, Primary Examiner

J. H. DERRINGTON, Assistant Examiner

U.S. Cl. X.R.

106—308 F, 308 N; 260—41.5 R, 41.5 A, 41.5 MP